United States Patent [19]

Willard, Sr.

[11] 4,377,599

[45] * Mar. 22, 1983

[54] PROCESSES FOR EMPLOYING TREATED SOLID CARBONACEOUS FOSSIL FUELS

[75] Inventor: John W. Willard, Sr., Rapid City, S. Dak.

[73] Assignee: Caw Industries, Inc., Rapid City, S. Dak.

[*] Notice: The portion of the term of this patent subsequent to Jul. 8, 1992, has been disclaimed.

[21] Appl. No.: 173,860

[22] Filed: Jul. 30, 1980

Related U.S. Application Data

[60] Division of Ser. No. 896,241, Apr. 14, 1978, Pat. No. 4,237,101, which is a division of Ser. No. 593,712, Jul. 7, 1975, Pat. No. 4,084,938, which is a continuation-in-part of Ser. No. 317,097, Dec. 20, 1972, Pat. No. 3,893,943, which is a continuation of Ser. No. 108,198, Jan. 20, 1971, abandoned.

[51] Int. Cl.$^3$ .......................... A23B 9/00; A23L 3/34; A23L 1/20
[52] U.S. Cl. .................... 426/310; 426/331; 426/623; 426/630; 71/63
[58] Field of Search ............... 423/150, 68, 1, 53, 423/69, 98, 508, 20, 3; 44/1 R, 1 G, 1 B, 6, 27; 208/8 R, 9, 8 LE; 260/514, 236.5; 252/446; 201/17; 71/63; 426/331, 335, 310, 532, 302, 630, 654, 419, 807, 623, 507

[56] References Cited

U.S. PATENT DOCUMENTS

| | | | |
|---|---|---|---|
| 194,727 | 8/1877 | Rymal | 426/630 |
| 216,199 | 6/1879 | Lukey | 426/630 |
| 1,312,521 | 8/1919 | De Long | 44/27 |
| 1,772,960 | 8/1930 | Oberle | 423/53 |
| 2,129,909 | 9/1938 | Barsky et al. | 44/6 |
| 2,288,874 | 7/1942 | Anderson et al. | 71/63 |
| 2,925,321 | 2/1960 | Mariacher | 423/20 |
| 3,288,569 | 11/1966 | Hendrickson et al. | 423/20 X |
| 3,692,503 | 9/1972 | Kukin | 44/6 X |
| 3,745,108 | 7/1973 | Schuman | 208/9 X |
| 3,801,710 | 4/1974 | Parish | 426/807 X |
| 3,928,620 | 12/1975 | Courtade et al. | 426/532 X |
| 3,988,238 | 10/1976 | McCollum et al. | 208/9 |
| 4,033,852 | 7/1977 | Horowitz | 44/1 R X |
| 4,067,712 | 1/1978 | Willard | 71/63 X |
| 4,067,713 | 1/1978 | Willard | 71/63 X |
| 4,067,715 | 1/1978 | Willard | 71/63 X |
| 4,078,480 | 3/1978 | Luck | 426/419 |
| 4,084,938 | 4/1978 | Willard | 44/1 R |

Primary Examiner—Kenneth M. Schor
Attorney, Agent, or Firm—L. S. Van Landingham, Jr.

[57] ABSTRACT

Solid carbonaceous fossil fuels such as coal, lignite and peat are treated with an aqueous medium containing a novel catalyst to remove undesirable constituents and produce valuable products. The catalyst is prepared by steps including admixing a water soluble alkali metal silicate with an aqueous medium containing carefully controlled amounts of dissolved water soluble substances which are sources of calcium ion and magnesium ion, reacting the same to produce an aqueous colloidal suspension of the reaction product, admixing a micelle-forming surfactant with the aqueous medium, and agitating the aqueous medium containing the colloidal particles and surfactant to form catalyst-containing micelles. Particles of the fossil fuel, or components thereof, are treated and solubilized in the aqueous catalyst suspension to produce a novel aqueous solution which has highly unusual and unexpected properties. The resultant solution has important applications in agriculture and animal husbandry.

Specifically, the solution is employed for storing grain and forage crops useful as animal feed; and for making the grain and forage crops more palatable and digestable.

25 Claims, No Drawings

PROCESSES FOR EMPLOYING TREATED SOLID CARBONACEOUS FOSSIL FUELS

RELATED APPLICATIONS

This application is a division of application Ser. No. 896,241, filed Apr. 14, 1978, now U.S. Pat. No. 4,237,101, which is a division of application Ser. No. 593,712, filed July 7, 1975, now U.S. Pat. No. 4,084,938, which in turn is a continuation-in-part of application Ser. No. 317,097, filed Dec. 20, 1972, now U.S. Pat. No. 3,893,943, which in turn is a continuation of application Ser. No. 108,198, filed Jan. 20, 1971, now abandoned.

THE BACKGROUND OF THE INVENTION

1. The Field of the Invention

This invention broadly relates to an improved process for treating solid fossilized carbonaceous fuels with an aqueous medium in the presence of a novel catalyst. The invention further relates to the removal of combustible sulfur and nitrogen compounds and other undesirable constituents from solid fossilized fuels, and the solubilization and recovery of metal and non-metal values therefrom. In one of its more specific variants, the invention is concerned with the preparation of solvent soluble organic compounds and an activated solid carbonaceous residue from solid fossil fuels. In another variant, the invention is concerned with the solubilization of solid carbonaceous fossil fuels or components thereof in an aqueous medium containing the aforementioned catalyst to thereby produce a novel aqueous solution which has highly unusual and unexpected properties.

2. The Prior Art

Solid fossilized carbonaceous fuels such as coal, lignite and peat are products of the gradual decomposition of vegetable matter without free access of air. Bituminous and anthracite coal, and to some extent lignite, are thought to have been formed in the presence of moisture at elevated temperature and pressure. Most authorities believe that coal passes through successive stages of peat, lignite or brown coal, sub-bituminous and bituminous or soft coal, and anthracite or hard coal under conditions of increasing temperature and pressure. The carbon content increases on a weight percent basis as the vegetable matter is transformed from peat into anthracite coal, and much of the carbon is combined with other elements such as hydrogen, sulfur, nitrogen and alkali metal, alkaline earth metal or heavy metal values.

Solid fossilized carbonaceous fuels and especially coal comprise high molecular weight three-dimensional cyclic structures which contain predominantly six membered rings. For example, it is known that coal contains bitumin and humin which have large, flat, aromatic lamellar structures that differ in molecular weight, degree of aromaticity, oxygen content, nitrogen content and the degree of cross-linking. Volatile matter, fusain, mineral matter, moisture, pyritic sulfur, inorganic sulfates, and organic sulfur and nitrogen compounds also are present. Fusain is a mineral charcoal which is consumed during burning in the presence of sufficient oxygen for complete combustion and the mineral matter remains behind as ash. Fusain, mineral matter and inorganic sulfates do not contribute to atmospheric pollution upon complete combustion of the coal. However, the presence of combustible sulfur such as pyritic sulfur and organic sulfur compounds results in the formation of sulfur oxides which, upon reaction with atmospheric moisture, produce highly corrosive sulfurous acid and/or sulfuric acid. Combustible nitrogen compounds also present similar problems. As a result, urban areas have strict air pollution regulations which require that the sulfur content of solid fossilized carbonaceous fuels be reduced to about 0.5% by weight or less of combustible sulfur so as to control atmospheric pollution.

The prior art processes for reducing the combustible sulfur content of solid fossilized carbonaceous fuels are expensive and require elaborate equipment, costly chemicals or vigorous reaction conditions such as high temperatures and pressures. As a result of the inherent deficiences of the prior art desulfurization processes, the coal industry has long sought an efficient low-cost process for removing combustible sulfur from coal.

Solid fossilized carbonaceous fuel also has been treated heretofore to produce organic chemicals, solid carbonaceous products such as coke and activated carbon, and liquid hydrocarbon fuels. For example, coke is produced by heating coal at about 1,000°–1,300° F., in a retort. The coke thus produced is a hard porous residium consisting largely of carbon admixed with mineral ash and other nonvolatile constituents of the original coal. Volatile byproducts are produced such as coal gas, coal tar, coal tar chemicals and ammonia. The low temperature carbonization of coal at temperatures of about 500°–700° F. produces products which differ substantially from those obtained at the higher carbonization temperatures. Nevertheless, both processes involve cracking of the large molecules of the coal to produce a solid residue consisting largely of carbon and mineral ash, and volatile constituents such as coal gas and normally liquid byproducts.

Liquid and gaseous fuels have been produced from coal by the Bergius Process. The early Bergius process usually consisted of mixing powdered coal with heavy tar from previous runs and approximately 5% of iron oxide as a catalyst. The pasty mass thus produced was heated with hydrogen at about 450°–490° F. for around two hours at a pressure of approximately 3,000 pounds per square inch. There has been much research in this area in an effort to produce petroleum-like materials from coal. The more recent processes use different and more effective catalysts and the reaction mixture is either in liquid or gaseous phase. In all of the processes, the coal is subjected to drastic processing conditions.

Activated carbon has been produced heretofore from coal using a combination of high temperature and various chemicals to convert the raw coal into an activated carbon residue. Some processes involve subjecting finely divided raw coal to high pressures and temperatures and treatment in the presence of steam alone or in combination with chemicals. In the latter process, the pressure is often reduced very quickly causing the steam that has penetrated the coal particles to expand rapidly. This ruptures bonds within the coal particles and increases the available surface area and porosity.

There are large deposits of solid fossilized carbonaceous materials in the United States which contain small percentages of valuable metal values or non-metal values. Examples of these deposits include uranium-bearing lignite and coal which are estimated to contain a substantial percentage of all known uranium reserves discovered to date. Often other valuable metal values are present such as molybdenum, cobalt, zirconium, germanium and the like. Selenium and other valuable non-metal values also are present in some deposits. Entirely satisfactory prior art processes were not available heretofore for solubilizing and recovering these metal values and/or non-metal values. For example, one prior art practice involves burning heavy metal-bearing lignite and recovering the ash which contains the metal values, and then processing the ash into a commercial form of the metal values for sale such as uranium oxide, vanadium oxide, molybdenum oxide, and the like. In accordance with another prior art practice, the fossil fuel is heated in a closed system in the presence of hydrogen and under drastic reaction conditions including high temperature and pressure, with or without a catalyst, to produce a liquid petroleum-like material and a solid residue which contains the metal values. The residue is separated from the liquid and gaseous products, and is further processed in accordance with prior art practices to recover the metal values in the form of a marketable commercial product.

All of the processes discussed above which have been used heretofore for converting solid fossilized carbonaceous fuels into more valuable products involve the use of elaborate equipment, numerous processing steps, large quantities of processing chemicals which are not readily recycled, and drastic reaction conditions. As a result, the processes available heretofore have been costly to practice and in some instances uneconomical.

It has also been proposed to use solid carbonaceous fossil fuels as fertilizer, and the presence of fungistatic and bacteriostatic ingredients has been suggested. However, entirely satisfactory processes were not available heretofore to produce acceptable commercial products on a reproducible basis.

THE SUMMARY OF THE INVENTION

The present invention overcomes the aforementioned and still other disadvantages of the prior art and provides a novel process for upgrading solid fossilized carbonaceous fuels and producing valuable products therefrom. The treating conditions are comparatively mild, and it is not necessary to use unusually high temperatures, pressures, expensive processing chemicals, elaborate apparatus, or other costly items.

It is an object of the present invention to provide a novel process for removing combustible sulfur, nitrogen and other deleterious constituents from solid fossilized carbonaceous fuels.

It is a further object to provide a novel process for treating solid fossilized carbonaceous fuels in an aqueous medium in the presence of a catalyst to produce valuable solvent soluble organic chemicals and a solid carbonaceous residue.

It is a further object to prepare a novel char from solid fossilized carbonaceous fuels which is useful as an absorbent or adsorbent.

It is a further object to provide a novel process for solubilizing and recovering valuable metal values or non-metal values from solid fossilized carbonaceous fuels.

It is a further object to provide a novel process for preparing organic compounds from solid fossilized carbonaceous fuels by destructive distillation wherein the solid fossilized carbonaceous fuel is treated in particulate form with an aqueous medium containing a catalyst prior to the destructive distillation step.

It is a further object to provide a novel process for preparing products useful in agriculture and animal husbandry from solid fossilized carbonaceous fuels.

It is a further object to provide a novel process for solubilizing solid fossilized carbonaceous fuels, or components thereof, and preparing an aqueous solution which has unique biocidal, medicinal and synergistic properties.

It is a further object to provide the novel products produced by the processes of the invention.

Still other objects and advantages of the invention will be apparent to those skilled in the art upon reference to the following detailed description and the examples.

THE DETAILED DESCRIPTION OF THE INVENTION INCLUDING THE PRESENTLY PREFERRED VARIANTS AND EMBODIMENTS THEREOF

In practicing the present invention, a solid carbonaceous fossil fuel in particulate form is intimately contacted with an aqueous medium containing a catalytically effective amount of a novel catalyst to be described more fully hereinafter. The solid fossil fuel is preferably coal, lignite, peat or admixtures thereof, and it has active sites which are capable of reacting with at least one component of the aqueous medium in the presence of the catalyst. The particles of the fossil fuel are contacted with the aqueous medium under liquid phase conditions until substantially all or a desired proportion of the active sites react with the aqueous medium. Thereafter the particles of fossil fuel may be further treated as will be described more fully hereinafter. It will be appreciated that there are certain variants of the invention which produce preferred results and these variants will likewise be discussed more fully hereinafter.

The fossil fuel need not be pretreated prior to treating with the aqueous medium other than, when desired, crushing or otherwise reducing it to a suitable particle size. The particle size is not critical and may vary over wide ranges as the aqueous medium has remarkable penetration properties and is capable of penetrating large lumps. The particle size may be, for example, from 1 inch to $-300$ mesh (Tyler screen) and preferably is about $-10$ mesh to $-200$ mesh, and for many applications is from $-50$ mesh to $-100$ mesh. It is understood that particles as large as 2, 3 or 4 inches, and often mine run fossil fuel, may be treated but longer periods of contact with the aqueous medium may be necessary to allow sufficient time for adequate penetration and reaction. Also, particle sizes smaller than $-300$ mesh may be treated but the expense of grinding the coal to such a fine particle size usually outweighs any advantages that are gained.

The particles of fossil fuel are intimately contacted with the aqueous medium under liquid phase conditions and in the presence of a sufficient volume of the aqueous medium to assure that the particles are conveniently and easily contacted therewith. The volume ratio of the aqueous medium to the particles of fossil fuel may vary over wide ranges. It is usually preferred that the aqueous medium be present in sufficient volume to allow the particles to be easily agitated therein such as by means of a prior art stirring or agitating device.

The concentration of the catalyst in the aqueous medium also may vary over a wide range as it is only necessary that a catalytic amount be present. Suitable catalyst concentrations are discussed more fully hereinafter. For example, the concentrated catalyst solution as produced by Example I may be diluted with approximately 30–1000 volumes of water and for better results in some instances with about 100–200 volumes of water to thereby arrive at a satisfactory aqueous treating medium.

The pH value of the aqueous treating medium also may vary over wide ranges such as from about 1 to 13.5. The initial pH value is preferably greater than 7, and is usually about 8–11. There is a tendency for the pH value to decrease as the reaction proceeds. If desired, the pH value of the aqueous medium may be adjusted as the reaction proceeds by addition of a base such as alkali metal hydroxide to thereby partially or fully restore the initial pH value, but this is not essential.

The temperature of treatment may likewise vary over wide ranges and may be, for example, between the freezing point and the boiling point of the aqueous medium under the existing pressure conditions. Usually atmospheric pressure is preferred, and in such instances, the aqueous medium may have a temperature of approximately 0° C. to 100° C. and is often about 20°–60° C. Surprisingly, lower temperatures of treatment such as 0°–10° C. appear to enhance the rate and degree of oxidation and thus lower temperatures may be preferred in instances where a maximum amount of oxidation is desired. Higher temperatures than 100° C. may be employed under superatmospheric pressure.

For example, provided that the pressure is sufficient under the existing temperature to maintain liquid phase conditions, the temperature may be 100°–200° C. or higher. Nevertheless, such extreme reaction conditions are not necessary and are usually avoided.

Inexpensive reaction vessels or open vats, with or without agitators and other simple auxiliary equipment, are satisfactory and may be used with good results. The period of treatment may be varied over wide ranges. It is only necessary that the aqueous medium be intimately contacted with the fossil fuel particles for a period of time sufficient for the reaction to occur and continued treatment is not deleterious. The minimum period of treatment will vary to some extent with the remaining conditions, such as the particle size of the fossil fuel, the concentration of the catalyst, the pH value of the aqueous medium and the reaction temperature. The period of treatment may vary, for example, from approximately 5 minutes or less to 24 hours or more but it is usually from about 15 minutes to 2 hours. As a general rule, the amount of oxidation increases with time provided all of the remaining conditions of treatment remain the same.

Solid carbonaceous fossil fuels such as coal, lignite and peat have active carbon atoms or active sites. Examples of the active sites include carbon-to-carbon double or triple bonds, carbon-to-oxygen bonds, carbon-to-sulfur bonds, carbon-to-nitrogen bonds, carbon-to-metal bonds, carbon attached to an electronegative group, and carbon bonded or otherwise attached or attracted to a dissimilar substrate which is a component of the fossil fuel. The catalyst of the present invention causes the liquid water in the aqueous treating medium to exhibit very unusual and heretofore unrecognized properties in the presence of fossil fuels having the aforementioned active carbon atoms or active sites. While the exact nature of the reaction is not known at the present time, it appears that water or some component of water reacts with or alters the active carbon atoms or active sites to thereby produce pronounced chemical and/or physical changes. For example, the fossil fuel may be oxidized to produce useful organic oxidation products such as carboxylic acids and hydroxycarboxylic acids. It is also possible to fix nitrogen in the form of organic compounds by treating the fossil fuel in the presence of an atmosphere containing elemental nitrogen. Additionally, combustable sulfur, nitrogen, and other deleterious substances are altered to permit their removal by prior art techniques such as by extraction in the aqueous treating medium or with solvents subsequent to the treatment. Additionally, metal values present in the fossil fuel are solubilized or rendered soluble upon extraction with solvents thereby allowing the metal values to be concentrated and recovered. The treated particles also have a much higher water content than before treatment. The aqueous treating medium following treatment contains the water soluble constituents of the treated fossil fuel particles.

The treated particles also undergo physical changes as well as chemical changes. For example, certain chemical or physical bonds existing within the particles are broken upon treatment with the aqueous medium. The resultant treated fossil fuel may be crushed, ground or otherwise reduced to a more finely divided form with little effort. It is also possible to easily separate and remove noncarbonaceous material such as mineral matter from the particles and thereby further reduce the concentration of undesirable sulfur and nitrogen compounds and ash-forming constituents. In instances where the fossil fuel is a carbonaceous ore containing valuable metal values, the treatment in the aqueous medium solubilizes or otherwise renders the metal values more susceptible to solvent extraction and concentration by prior art hydrometallurgical techniques.

When the aqueous medium containing the novel catalyst is contacted with the fossil fuel, there is a period of activation during which there is little or no reaction. This activation period may be eliminated or reduced markedly by pre-treating the fresh catalyst suspension with a small portion of the fossil fuel, or by using a recycled catalyst solution from a previous treatment. In a preferred variant, all or part of the aqueous catalyst suspension is recycled so that an activated catalyst is always available for contacting with fresh portions of the fossil fuel. The activated aqueous catalyst suspension thus produced is much more effective and has properties which differ substantially from those of the initially prepared catalyst.

The aqueous treating medium containing the water soluble constituents of the treated fossil fuel is separated from the particles. When desired, all or a portion of the separated treating medium may be recycled and used to treat additional fossil fuel as aforementioned. The resultant treated particles are changed in appearance and acquire the physical appearance and properties of weathered (oxidized) fossil fuels such as Leonardite. The separated particles may be washed with water and then extracted with various solvents to recover organic compounds and other desired constituents therefrom. The soluble constituents in the aqueous medium may be recovered therefrom by precipitation, such as by precipitation with a mineral acid, or other techniques may be employed such as by evaporating the water and precipitating the desired constituents from the concentrated liquor.

The treated particles contain large amounts of water and the excess water and organic compounds may be removed therefrom simultaneously by extracting with a water soluble organic solvent. Examples of suitable water soluble organic solvents include the water soluble alcohols and especially those containing about 1–4 carbon atoms, the water soluble ketones and especially those containing about 1–4 carbon atoms, water soluble polyhydroxy compounds such as the glycols, and other similar water soluble organic solvents. The treated fossil fuel is intimately contacted with the water soluble organic solvent under liquid phase conditions. The temperature of extraction may vary between the freezing point and the boiling point of the solvent, but is preferably about room temperature or at a moderately elevated temperature. This extraction usually removes most of the absorbed water and organic compounds. In instances where the extracted fossil fuel contains organic compounds which are not soluble in the organic solvent, then they may be extracted with a water insoluble organic solvent such as normally liquid hydrocarbons and especially those containing about 5–12 carbon atoms, normally liquid halogenated hydrocarbons and especially those containing about 4–8 carbon atoms, and normally liquid fractions derived from petroleum such as petroleum ether, gasoline, kerosene, gas oil, and diesel fuel. This second extraction with the water insoluble organic solvent is likewise carried out under liquid phase conditions and at temperatures between the freezing point and boiling point of the solvent under the existing pressure, and preferably at approximately room temperature or at a moderately elevated temperature.

The resultant extracted solid fossil fuel residue is substantially free of organic compounds produced by the treatment but contains inorganic compounds which may be removed by extraction. The extracted residue is separated from the organic solvent and the inorganic compounds may be recovered therefrom by extraction with water soluble bases and/or acids. The extracted organic compounds may be separated from the aforementioned water insoluble organic solvents by distillation or fractionation. It is usually desirable to acidify the organic solvent-water solution before distillation. It is possible to separate the extracted organic compounds from the water soluble organic solvent by agitating with a water insoluble solvent as aforementioned. When this is done, some of the extracted organic compounds dissolve in the water insoluble organic solvent and form one layer. Another layer of extracted organic compounds separates as a semisolid layer, and the water content of the extraction mixture separates as a third layer. The water layer may be drawn off and discarded, and the upper two layers may be separated individually or as a mixture from which the water insoluble solvent is separated by distillation or fractionation. The resultant organic compounds or coal chemicals are valuable raw materials for the production of prior art organic compounds.

The organic solvent extracted residue may be further extracted with an aqueous acidic solution of an organic and/or inorganic acid. Examples of water soluble acids include hydrochloric acid, nitric acid, sulfuric acid, phosphoric acid and water soluble organic acids such as formic acid, acetic acid, propionic acid, and trichloroacetic acid. Extraction with the aqueous acid results in the removal of compounds containing metal values and other inorganic constituents. In instances where the treated fossil fuel contains metal values or non-metal values such as uranium, cobalt, vanadium, molybdenum, zirconium, germanium or selenium, then surprisingly the desired values may be solubilized and recovered by prior art hydrometallurgical techniques. The treatment of the fossil fuel with the catalyst suspension alters the metal and non-metal values and renders them amenable to solubilization and extraction in the acidic leach solution whereas prior to the treatment, the metal values can not be easily solubilized and extracted.

The organic solvent extracted residue also may be further extracted with an aqueous base. Examples of water soluble bases which may be used include sodium hydroxide, potassium hydroxide and ammonium hydroxide. The aqueous solution of the base may be intimately contacted with the fossil fuel residue and any amphoteric metal values and soluble non-metal values may be removed, or other soluble inorganic constituents. The extraction step with the aqueous base may either precede or follow the extraction step with the acidic solution depending upon the substances to be removed. As was true of the acid extraction step, valuable metal or non-metal values may be recovered from the leach solution following prior art hydrometallurgical techniques.

The resultant extracted fossil fuel residue now has the desirable properties of activated charcoal or activated carbon. For example, the extracted residue may be used to absorb acidic gases such as hydrogen chloride, hydrogen fluoride, hydrogen bromide, hydrogen sulfide, sulfur dioxide, sulfur trioxide, carbon dioxide and halogens including chlorine, fluorine, and bromine. The acidic gases may be absorbed by passing a gaseous stream containing the substance to be absorbed through a contained body of the extracted fossil fuel residue following a technique analogous to that employed with activated carbon or activated charcoal. When the fossil fuel residue has reached its absorption capacity, it may be regenerated and thereafter reused by intimately contacting it with an aqueous solution of a base such as aqueous sodium hydroxide, potassium hydroxide, or ammonium hydroxide. This is a convenient method of preparing salts of the acidic substance and especially hypohalite salts.

The extracted fossil fuel residue is also capable of absorbing large quantities of normally liquid hydrocarbons. Thus, the extracted particles may be used to absorb petroleum or liquid fractions derived therefrom and thereby control oil spills. The extracted particles are lighter than water, and in instances where the oil is present in the form of an oil slick floating on the water, the floating extracted particles are in intimate contact therewith and absorb the oil. The resultant solid residue and the absorbed oil content may be easily separated from the water by skimming, filtration or other suitable separation process.

In a further variant of the invention, the fossil fuel is treated with an oxidizing agent before, during or following treatment with the aqueous medium containing the catalyst to thereby aid in solubilizing additional organic compounds. The oxidizing agent may be air, elemental oxygen, ozone, peroxides such as hydrogen peroxide or the alkali metal peroxides, or other suitable oxidizing agents. The fossil fuel is reacted with the oxidizing agent in an amount to partially oxidize or artificially weather it without combustion. For example, air or elemental oxygen may be bubbled through the aqueous medium while in contact with the fossil fuel, or the fossil fuel may be intimately contacted with air or elemental oxygen at elevated temperature prior to treatment with the aqueous medium. Also, the extracted fossil fuel particles from which the organic and/or inorganic constituents have been removed may be partially oxidized by intimately contacting the same with an oxidant to produce additional oxygenated organic compounds. The oxygenated organic compounds thus produced may be recovered by the afore-mentioned extraction steps.

In a further variant of the invention, the extracted fossil fuel is subjected to destructive distillation to produce organic compounds. The resultant organic compounds are not the same as are produced when destructively distilling the original fossil fuel. Thus, the treatment of the fossil fuel alters the chemical composition and allows novel destructive distillation products to be produced.

The treated fossil fuel is also useful in the preparation of a synthetic fertilizer. The fertilizer may be prepared by adding to the treated fossil fuel a phosphate-containing compound such as phosphoric acid or the alkaline earth metal salts thereof, a nitrogen containing compound such as ammonia, ammonium salts or nitrates, and a potassium-containing compound such as potassium chloride. This is preferably done while the treated fossil fuel is wetted with the aqueous treating medium. The resultant fertilizer has trace elements and humus contained in the fossil fuel in addition to the added phosphorus, nitrogen and potash and it is remarkably effective. Lignite, and especially weathered lignite such as Leonardite, is especially useful in preparing fertilizers. p The extracted fossil fuel is substantially free of deleterious pollutants such as combustible sulfur and nitrogen compounds and it may be used as a premium fuel. Very little of the heat value is lost and it may be burned in coal-burning furnaces in a manner analogous to coal. The treated fossil fuel may be pelletized if desired prior to burning. The combustion gases are substantially free of sulfur dioxide or trioxide and thus the fuel meets strict standards in this respect. In instances where the treated fossil fuel is used for firing boilers, the tube life is increased very markedly due to the absence of corrosive contaminating substances which tend to shorten tube life.

The oxidation of the fossil fuel and the formation of acidic organic compounds may be enhanced by treating with the aqueous catalyst suspension at temperatures approaching the freezing point, such as about 0°–10° C. and preferably about 0°–4° C. The degree of oxidation is also controlled to some extent by the materials used in constructing the reaction vessel and the materials of construction of auxiliary apparatus in contact therewith such as agitators. Surprisingly, constructing the equipment from nonconductors of electricity such as polyolefins results in a maximum degree of oxidation under a given set of operating conditions. Constructing the equipment from good conductors of electricity such as steel and other metals results in a minimum degree of oxidation for a given set of treating conditions, whereas constructing the equipment from glass or ceramic materials results in an intermediate degree of oxidation. The reason for this unusual phenomenon is not fully understood at the present time but it is obvious that the three products differ markedly. Thus, the process of the present invention is capable of controlling the level of oxidation under a given set of reaction conditions.

It is not always necessary nor desirable to separate the catalyst suspension from the treated fossil fuel. For example, in some instances it is advantageous to evaporate the water content of the aqueous suspension, either at atmospheric pressure or preferably under reduced pressure, to thereby deposit the catalyst micelles on the treated fossil fuel particles. When this is done, addition of water thereto reactivates the catalyst micelles and the particles are subjected to a further treatment with the aqueous catalyst suspension. This variant is especially advantageous in instances where it is desired to prepare the solution of the treated fossil fuel to be described hereinafter.

In a further variant of the invention, the solid particles of the treated fossil fuel, or components thereof, are further treated and solubilized in the aqueous catalyst suspension to produce a novel aqueous solution which has highly unusual and unexpected properties. The term "solution" as used herein when referring to this product is intended to embrace finely divided suspended substances which are not in true solution. The resulting solution has, for example, unique germicidal, medicinal, and synergistic properties, and it also has important applications in agriculture and animal husbandry. Additionally, the resultant solution may be used in practicing the applicant's invention disclosed and claimed in U.S. Pat. Nos. 3,864,475 and 3,874,927, and copending U.S. patent applications Ser. Nos. 388,774, 389,541, 455,022, 389,542 and 455,021. The disclosures of these patents and pending applications are incorporated herein by reference. It is understood that the fossil fuel solutions described hereinafter, which contain the novel catalyst suspension of the invention as an ingredient, may be substituted for the aqueous catalyst suspension per se which is used in the aforementioned United States Patents and pending United States applications. It is only necessary to substitute a like amount of the solution of this invention for the aqueous catalyst suspension of the prior inventions based upon the weight of the catalyst present in each instance.

The fossil fuel solutions described hereinafter may be prepared from coal, lignite or peat. However, the solutions prepared from lignite produce superior results and thus are presently preferred. Accordingly, the discussion appearing hereinafter may be directed specifically to the use of lignite but it is understood that the invention is not necessarily limited thereto.

The lignite is first treated with the aqueous catalyst suspension following the aforementioned general procedure to produce a catalyst treated lignite product. It is usually preferred that the aqueous catalyst suspension be evaporated, preferably under vacuum, to thereby deposit the catalyst micelles on the lignite particles and produce a dry treated lignite product for subsequent use. In such instances, it is only necessary to add water to reactivate the catalyst micelles and thereby further treat the lignite particles. In instances where the catalyst suspension was removed from the treated particles, then it is necessary to further treat the lignite particles with additional catalyst suspension. It is also usually preferred to use a concentrated catalyst suspension, such as that produced in Example I prior to dilution. The catalyst suspension used in the further treatment either contains sufficient alkali metal base to form water soluble salts of the organic acids that are produced, or additional alkali metal hydroxide may be added for this purpose. Ammonium hydroxide also may be used. Additionally, in instances where the lignite initially treated has not been oxidized or weathered, it is usually preferred to add an oxidizing agent at some stage of the treating process. This may be during the first treatment of the lignite, or it may be during a subsequent treatment with the aqueous catalyst suspension. Also, the treated lignite particles may be extracted with organic solvents and/or aqueous solutions of acids or bases prior to solubilization. Regardless, of the specific procedure which is followed, the lignite particles are treated with the aqueous catalyst suspension in the presence of sufficient base such as alkali metal hydroxide and/or ammonium hydroxide to result in the formation of humin salts or other organic acid salts.

The concentrations of the catalyst suspension and the dissolved solids in the solution may vary over extremely wide ranges. In a number of instances, the concentrations thereof are determined to some extent by the end use of the solution. Some uses require very dilute solutions, whereas other uses require much more concentrated solutions. Also, it is often advantageous to market a concentrated solution which is diluted by the customer at the time of use to save packaging and shipping costs. As a general rule, the concentration of catalyst solids in the solution is within the ranges aforementioned for the aqueous treating medium. The concentration of dissolved lignite in the solution may be from about 0.1 part per million to about 10% by weight, or higher. Solutions containing at least 500 parts per million of dissolved lignite, and preferably about 600-700 parts per million or more exhibit pronounced bacteriostatic and/or fungistatic properties. Solutions for general use in agriculture and animal husbandry need contain only about 0.5-100 parts per million of dissolved lignite, although more concentrated solutions may be provided initially for dilution. As a general rule, the solutions usually contain 1% or less of dissolved lignite.

The solutions of the solid carbonaceous fossil fuel are useful in a number of diverse fields. This is thought to be due in part to the presence of trace elements and organic compounds used by the growing vegetation which was the precursor of the coal, lignite and peat. The treatment of the fossil fuel with the aqueous catalyst alters the structure thereof and liberates and makes available the trace elements and other substances contained therein. The solution contains substances which have properties characteristic of bacteriocides and fungicides and which are capable of protecting seeds, plants during their growth, and animals consuming the plants. Other useful substances also are present such as bio-regulators which control the rate of growth and especially growth accelerators, and substances which enhance the resistance of the plants to adverse conditions of growth or stress such as freezing, drought, physical damage to foilage and transplanting.

The solutions of the fossil fuel have the following uses in agriculture:

1. Soil treated with a dilute aqueous solution of the solubilized fossil fuel is markedly more fertile than untreated soil and the increase in fertility cannot be attributed to the plant food content of the solution. It appears that formerly unavailable nutrients in the treated soil become available for use by growing plants following treatment with the solution. This increases the effective concentration of available nutrients in the soil and thereby increases the fertility and promotes the growth of plants.

2. Addition of the solution to the soil appears to cause the soil to attract and hold moisture. Laboratory tests prove that temperatures as high as 350° F. are necessary to remove all of the water from the treated soil. The water is retained at temperatures far in excess of the boiling point.

3. The solubilized lignite is largely in the form of salts of humic acid and other carboxylic acids. Treatment of soil with the solution thus adds humus and the other aforementioned desirable substances.

4. Seeds sprayed with the lignite solution when in the seed bed sprout faster and have a higher germination rate than untreated seeds. The seedlings also have a very rapid growth rate and may be transplanted earlier.

5. Cuttings placed in a dilute solution of lignite form sufficient roots for transplanting much more rapidly than the same cuttings placed in untreated water.

6. Plants treated with the lignite solution withstand drought better than untreated plants.

7. Plants treated with the lignite solution grow much larger than untreated plants, and the quality of the produce is as good or better than that from untreated plants or seeds.

8. Plants such as potatoes sprayed with the lignite solution recover faster after a hard freeze than do untreated plants. Crops such as potatoes may be planted much earlier in the Spring and in some instances even in the Fall.

The lignite solution is also useful in the storage of crops. Lignite solutions sprayed on corn in non-airtight storage having a moisture content of 25% eliminate mold and rot. The treated corn also has a sweet silage-like odor and samples show the protein content increased from 9% to 12% due to the growth thereon of a protein-yielding yeast. There was also some evidence of an increase in sugar content. Cubes formed from new mown hay and treated with the lignite solution did not spoil when exposed to the elements whereas untreated cubes did spoil. Grain and forage appears to be more palatable and digestible when sprayed with the lignite solution than when untreated. Tests with a fungi inperfecti grown on ligno-cellulose treated with the lignite solution showed that protein is produced at low cost which is suitable for use as animal feed.

The catalyst treated fossil fuels, and especially catalyst treated lignite, are useful as animal feed supplements. The fossil fuel solutions also may be similarly used. It is only necessary to add the treated fossil fuel or solution to the standard feed mixture in an amount of, for example, approximately 1-10% and preferably approximately 5%. Animals eating the feed grow faster and with less disease than animals fed untreated feed.

The lignite solution has medicinal and synergistic properties which render it useful in animal husbandry applications. For example, it may be synergistically combined with antibiotics in the treatment of foot-rot in sheep and cattle and pink eye or cancer eye in cattle. It is also useful in relieving stress and infection in weaning calves and pigs, in the treatment of burns, cuts, bruises, and sprains, in the treatment of ketosis in sheep.

The preparation of the novel catalyst used in practicing the present invention is described hereinafter.

PREPARATION OF THE CATALYST

The catalyst used in practicing the present invention may be prepared as described below. In the presently preferred process for preparing an aqueous suspension of the catalyst, a water soluble alkali metal silicate is admixed and reacted with an aqueous solution of a water soluble dissolved substance which is a source of calcium ion and a water soluble dissolved substance which is a source of magnesium ion to produce a finely divided or colloidal suspension of the reaction product. The aqueous solution contains the dissolved substances initially in amounts to provide between about $1 \times 10^{-4}$ and $1 \times 10^{-1}$ mole per liter each of calcium ion and magnesium ion, preferably between about $1\times10^{-3}$ and $1\times10^{-2}$ mole per liter, and for still better results between $1\times10^{-3}$ and $6\times10^{-3}$ mole per liter. The dissolved substances should also be present in amounts to provide a molar ratio of calcium ion to magnesium ion between about 2.0:1.0 and 1.0:2.0, and preferably about 1.5:1.0 and 1.0:1.5. For best results, the aqueous medium should contain the dissolved substances in amounts to provide between about $2.5\times10^{-3}$ and $3.0\times10^{-3}$ mole per liter each of calcium ion and magnesium ion, and the molar ratio of calcium ion to magnesium ion should be about 1.0:1.0, e.g., $2.9\times10^{-3}$ mole per liter of calcium ion and $2.7\times10^{-3}$ mole per liter of magnesium ion. The alkali metal silicate should have an alkali metal oxide to silicon dioxide ratio between about 0.9:1.0 and less than 2.0:1.0, and preferably between about 0.9:1.0 and 1.2:1.0. The alkali metal silicate should be admixed with the aqueous medium in an amount of about 0.05-2 moles per liter, preferably about 0.1-1 mole per liter, and for still better results about 0.2-0.5 mole per liter. For best results, the alkali metal silicate should be an alkali metal meta-silicate having an alkali metal oxide to silicon dioxide ratio of about 1:1, and it should be admixed with the aqueous medium in an amount to provide about 0.2-0.3 mole per liter, e.g., about 0.25 mole per liter.

Examples of sources of calcium ion and magnesium ion for use in preparing the aqueous solution include mineral acid salts such as the halides, sulfates, bisulfates, nitrites, and nitrates of calcium and magnesium. The chlorides are usually the preferred halides, and both calcium and magnesium chloride are soluble and may be used. Magnesium sulfate and bisulfate are soluble and often are the preferred sources of magnesium ion. Calcium sulfate is only slightly soluble in water and usually is not a preferred source of calcium ion, but calcium bisulfate is somewhat more soluble. While calcium and magnesium nitrite or nitrate are soluble in water and may be used, these substances are not preferred in most instances. The sources of calcium ion and magnesium ion are dissolved in the aqueous medium in amounts to provide calcium ion and magnesium ion within the above ranges. Complete ionization is assumed when calculating the quantities to be dissolved and any desired order of addition is satisfactory. For example, the source of calcium ion may be added to the aqueous medium before, during or after the source of magnesium ion.

The alkali metal silicate to be admixed with the aqueous medium is preferably a water soluble sodium or potassium silicate having an alkali metal oxide ($M_2O$) to silicon dioxide ($SiO_2$) mole ratio between about 0.9:1.0 and less than 2.0:1.0, and preferably between about 0.9:1.0 and 1.2:1.0. The best results are usually obtained with an alkali metal metasilicate having an alkali metal oxide to silicon dioxide ratio of about 1:1. Hydrated alkali metal silicates dissolve faster and should be used for best results when the alkali metal silicate is added in solid form. In instances where an anhydrous alkali metal silicate is used, it may be desirable to dissolve it in water and then add the solution to the aqueous medium. Sodium metasilicate is preferred and usually a hydrated sodium metasilicate such as the pentahydrate gives the best results.

Carbonate ion and/or bicarbonate ion should not be present in the aqueous medium in substantial concentrations as the calcium ion and magnesium ion are precipitated in the form of their respective carbonates. The free carbonate ion and/or bicarbonate ion concentrations in the aqueous medium should not exceed about 10 parts per million by weight based upon the combined weight of the water and the ingredients added thereto and for this reason, the alkali metal silicates should be substantially free of carbonate ion and bicarbonate ion. A small amount of precipitated calcium carbonate and/or magnesium carbonate may be present in the aqueous medium provided additional calcium ion and magnesium ion are available to meet the above defined concentrations.

Distilled water and/or deionized water are usually preferred over a natural or untreated water when preparing the aqueous medium. In instances where water is used which contains substantial initial concentrations of alkaline earth metal ions, then this should be taken into consideration in calculating the amounts of the sources of calcium ion and magnesium ion which are necessary to arrive at the final concentrations previously discussed.

An electrolyte which aids in the preparation of colloidal suspensions may be present in the aqueous medium at the time of admixing the alkali metal silicate therewith. Examples of electrolytes include those used in preparing prior art colloidal suspensions such as the alkali metal halides, sulfates and bisulfates. Sodium chloride, sodium sulfate and sodium bisulfate are usually preferred. The electrolyte should be added in small amounts such as, for example, about 0.00001-0.1 mole per liter, but often larger or smaller amounts may be present.

The conditions under which the alkali metal silicate is admixed with the aqueous medium and reacted with the sources of calcium ion and magnesium ion are not critical provided the reaction mixture is maintained in the liquid phase. The reaction temperature may be, for example, between the freezing point and boiling point of water under the existing pressure conditions. At atmospheric pressure, the temperature is usually about 10°-90° C. and often a more convenient temperature is about 20°-50° C. In many instances, ambient or normal room temperature is satisfactory.

The degree of agitation is not critical, and mild to vigorous agitation may be employed during addition of the alkali metal silicate. For the best results, the aqueous medium should be agitated sufficiently to assure rapid and uniform admixing of the alkali metal silicate. After completing the addition of the alkali metal silicate, when desired the agitation may be continued for a sufficient period of time to assure complete reaction and aging of the resulting colloidal suspension, such as for approximately 1-5 minutes to one hour or longer.

Upon admixing the alkali metal silicate with the aqueous medium, it takes on a turbid appearance but in most instances no significant amount of visible precipitate is formed. The colloidal suspension of the reaction product thus produced should be strongly basic and may have a pH value of, for example, approximately 10-14 and preferably about 11-13, and for best results about 12. In view of this, the initial pH value of the aqueous medium containing the dissolved sources of calcium ion and magnesium ion is of importance and should be about 6-9 and preferably about 7-8. When necessary, it is possible to adjust the pH value of the aqueous medium to the foregoing levels either before during or after addition of the alkali metal silicate by adding bases such as sodium or potassium hydroxide, or mineral acids such as sulfuric or hydrochloric acid.

The colloidal suspension may be stored for several weeks or longer while awaiting the further treatment described hereinafter. In instances where the colloidal suspension is to be stored over a substantial period of time, the pH value should be maintained at the above described level and the storage vessel is preferably a tightly capped polyethylene bottle or other inert plastic container which prevents the contents from absorbing carbon dioxide from the atmosphere.

The colloidal suspension of the reaction product is not suitable for use as a catalyst as prepared and it should be agitated sufficiently in the presence of a micelle-forming surfactant to form catalyst-containing micelles. The degree of agitation, the length of the agitation period, and the amount of the micelle-forming surfactant that is present in the colloidal suspension are controlled at levels favorable to the formation of micelles. For example, the surfactant may be present in an amount of about 0.001–0.1 mole per liter and preferably about 0.03–0.07 mole per liter for most surfactants. Smaller or larger amounts may be effective with some surfactants such as 0.0001 mole per liter or less, or 0.2 mole per liter or more. About 0.05 mole per liter often gives the best results with many surfactants.

The minimum period of agitation and the minimum degree of agitation that are required for micelle formation varies somewhat with temperature and the type and amount of surfactant. As is well understood in this art, gradually increasing these variants in the presence of an effective amount of the micelle-forming surfactant will result in micelle formation when the proper levels are reached. As a general rule, longer periods of agitation and/or more vigorous agitation are required to form micelles at lower temperatures approaching the freezing point of the colloidal suspension than at higher temperatures approaching the boiling point. In instances where the aqueous suspension has a temperature of approximately 50°–90° C., then mild agitation over a period of about 10–60 minutes is satisfactory. Often longer or shorter periods of mild to vigorous agitation may be employed such as from about 1–5 minutes to several hours at temperatures varying, respectively, between the boiling point and the freezing point. When desired, the agitation may be continued long after the catalyst-containing micelles are formed as continued agitation does not seem to have an adverse affect.

As a general rule, the micelle-forming surfactants known in the prior art may be used in practicing the present invention. Micelle-forming surfactants used in the emulsion polymerization of monomeric organic compounds are disclosed in the text *Synthetic Rubber*, by G. S. Whitby, et al, John Wiley & Sons Incorporated, New York (1954), and surface active agents in general are disclosed on pages 418–424 of the text *Organic Chemistry*, Fieser and Fieser, 2nd Edition, Reinhold Publishing Corporation, New York, New York (1950), the disclosures of which are incorporated herein by reference. Examples of surfactants disclosed in the above texts include the alkali metal soaps of long chain fatty acids, and especially the sodium and potassium soaps of fatty acids containing about 14–25 carbon atoms and preferably about 16–18 carbon atoms, and the sodium and potassium soaps of the rosin acids, abietic acid and the derivatives thereof. Other micelle-forming surfactants include fats and oils such as corn oil, cotton seed oil, castor oil, soy bean oil and safflower oil which have been fully or partially saponified with alkali metal bases to produce mixtures including saponified long chain fatty acids, the mono- or di-glycerides thereof, and glycerin.

Examples of synthetic micelle-forming surfactants include the sulfonates of long chain alcohols prepared by hydrogenation of naturally ocurring fats and oils of the above types and especially sulfonated long chain alcohols containing about 10–20 and preferably about 12–14 carbon atoms, the alkali metal salts of the monosulfonates of monoglycerides such as sodium glyceryl monolaurate sulfonate, the sulfonates of succinic acid esters such as dioctyl sodium sulfosuccinate and the alkylaryl alkali metal sulfonates. Specific examples of presently preferred micelle-forming surfactants include sodium and potassium sulforicinoleate, tetrahydronaphthalene sulfonate, octahydroanthracene sulfonic acid, butyl naphthalene sulfonic acid, sodium xylene sulfonate, alkyl benzene sulfonic acid and potassium benzene sulfonate.

Sulfated long chain hydroxycarboxylic acids containing about 14–25 carbon atoms and preferably about 16–18 carbon atoms, and sulfated fats and oils containing hydroxycarboxylic acids of this type produce exceptionally good micelle-forming surfactants. At least 25% of the hydroxyl groups and preferably at least 50% should be sulfated, and up to 95–100% may be sulfated. It is usually preferred that the sulfated oils and/or long chain hydroxycarboxylic acids be neutralized with an alkali metal base, and that the corresponding alkali metal salts be added to the colloidal suspension in the form of an aqueous solution. The aqueous solution may contain at least 25% of water and preferably at least 35–40% by weight. Much larger percentages of water may be present when desired such as 75–80% or more by weight.

A very active catalyst is produced when using sulfated castor oil as the micelle-forming surfactant (Turkey Red oil). Sulfated castor oil which has been purified sufficiently to be of U.S.P. or medicinal grade produces an exceptionally active catalyst. For the best results, the castor oil is reacted with about an equal weight of concentrated sulfuric acid (e.g., 20% by weight) at a temperature of approximately 25°–30° C. The mixture may be reacted for about two hours with stirring and is then neutralized with sodium hydroxide solution. The reaction mixture separates into three layers, i.e., an upper layer which is a water solution, an intermediate or oily layer, and a white curdy precipitate. The intermediate oily layer is separated from the upper and lower layers, and may be added to the colloidal suspension as the micelle-forming surfactant in an amount, for example, of 0.001–0.1 mole per liter, and preferably about 0.005 mole per liter.

The activity of the catalyst may be increased very markedly by cooling the aqueous catalyst suspension to a temperature approaching the freezing point such as about 0°–10° C., and then warming over one or more cycles. For best results, the aqueous catalyst suspension should be frozen and thawed over one or more cycles. The reason for the increased catalytic activity is not fully understood at the present time but cooling and then warming and aqueous catalyst suspension seems to increase the concentration of the catalyst-containing micelles and/or increases the catalytic activity thereof.

The aqueous suspension of the catalyst contains a relatively small percentage by weight of the active catalyst as produced. When desired, it may be concentrated by evaporating a portion of the water to produce a concentrated liquid catalyst suspension which may be stored and used more conveniently. It is also possible to prepare a dry catalyst concentrate by evaporating substantially all of the water. The preferred method of producing the dry catalyst concentrate is by flash evaporation using a technique analogous to that employed in preparing powdered milk. The catalyst concentrates produced upon partial or complete evaporation of the water content of the initially prepared aqueous suspension may be reconstituted by addition of water with little or no loss of catalytic activity. Preferably, the water is added to the dry catalyst concentrate under sufficiently vigorous conditions of agitation to assure that the catalyst micelles are resuspended and uniformly distributed.

The aqueous catalyst suspension may be used as produced for treating the coal, lignite and peat, or it may be diluted with approximately 2–10,000 parts by weight of water. For better results, the catalyst suspension as produced may be diluted with about 250–2,000 parts by weight of water, and preferably with about 500–1,000 parts by weight of water, and then used. It is only necessary that the coal, lignite and peat be treated with a liquid phase aqueous medium containing a catalytic amount of the catalyst. The aqueous medium may contain, for example, about 0.0001–0.3% by weight of the catalyst, but larger or smaller amounts may be present when desired. Usually the aqueous medium contains about 0.004–0.08% by weight of the catalyst, and often about 0.006–0.007% by weight gives the best results. A surface active agent may be added thereto when desired as previously discussed. Alternatively the dry catalyst or liquid catalyst concentrate may be admixed with water and/or the surface active agent to provide an effective catalyst concentration in the quantities previously discussed. The weight of the catalyst is calculated on a dry solids basis, i.e., the weight of the catalyst ingredients in the aqueous suspension as produced after removal of the water.

In a further variant of the process for preparing the catalyst, at least one dissolved substance providing at least one amphoteric metal-containing ion is present in the aqueous medium at the time of reacting the alkali metal silicate with the substances providing calcium ion and magnesium ion. The substance or substances providing the amphoteric metal-containing ion or ions may be present, for example, in an amount sufficient to provide about 0.0001–1% and preferably about 0.01–0.5% by weight when calculated as the amphoteric metal oxide and based upon the weight of the alkali metal silicate. Preferred amphoteric metals include aluminum and/or zinc, and the preferred sources thereof include alkali metal aluminate and zincate of which sodium aluminate and/or zincate usually give the best results. The alkali metal aluminate and/or zincate may be added directly to the aqueous medium, or as the mineral acid salts, oxides and/or hydroxides which then form the alkali metal aluminate and/or zincate under the highly alkaline conditions that exist.

Surprisingly, an aqueous suspension of catalyst which was used previously in treating coal, lignite and peat in the process of the invention produces a more active catalyst than either distilled water or deionized water. In one preferred variant of the invention, spent aqueous catalyst suspension is recycled indefinitely in a process for treating the coal, lignite or peat with periodic additions of the chemicals necessary to maintain the desired concentration of the catalyst. The catalyst produced by this variant exhibits greatly enhanced initial catalytic activity and results in a rapid attack on the active sites of the coal, lignite and peat.

The invention is further illustrated by the following specific examples.

EXAMPLE I

This example illustrates one presently preferred process for preparing the novel catalyst used in practicing the invention.

Anhydrous calcium chloride in an amount of 0.66 gram and magnesium sulfate heptahydrate in an amount of 1.32 grams were dissolved in two liters of deionized water with stirring and warming until solution was complete. Then 95 grams of sodium silicate pentahydrate having a molecular ratio of sodium oxide to silicon dioxide of 1:1 were added to the solution with stirring and continued warming to produce a white colloidal suspension of the reaction product.

After setting for 10 minutes, the colloidal suspension was heated to 80° C. and sulfated castor oil in an amount of 201 grams was added with stirring. The average molecular weight of the sulfated castor oil was 940 and it contained 50% of water. The turbidity lessened somewhat as the colloidal suspension was heated at 80°–90° C. for one hour with vigorous stirring to produce catalyst micelles. The aqueous suspension of catalyst micelles thus prepared had a viscosity similar to that of water and it was used as the catalyst in certain Examples as noted hereinafter.

A dry or solid catalyst concentrate was prepared in a further run by evaporating water from the initially prepared aqueous catalyst suspension. The resulting dry catalyst concentrate was resuspended in water and there was no substantial loss of catalytic activity. In still other runs, the catalytic activity of the aqueous suspension of catalyst as initially prepared, the diluted aqueous suspension of catalyst, and the reconstituted aqueous catalyst suspension was enhanced by freezing and thawing.

EXAMPLE II

This example illustrates the preparation of additional catalyst suspensions.

Five suspensions of the catalyst were prepared from the same ingredients as used in Example I and following the general procedure of Example I. The ratios of ingredients were varied as follows:

| Ingredient | Amount of Ingredient | | | | |
| --- | --- | --- | --- | --- | --- |
| | Run 1 | Run 2 | Run 3 | Run 4 | Run 5 |
| Deionized water | 2 l | 1.5 l | 1.5 l | 1.5 l | 0.25 l |
| CaCl$_2$ | 0.66 g | 0.5 g | 0.5 g | 1.0 g | 0.5 g |
| MgSO$_4$.7H$_2$O | 1.32 g | 1.0 g | 1.0 g | 2.0 g | 1.0 g |
| Na$_2$SiO$_3$.5H$_2$O | 165 g | 132 g | 71 g | 185 g | 71 g |
| Sulfated Castor oil | 100 ml | 150 ml | 150 ml | 200 ml | 150 ml |
| | (approximately 50% by weight H$_2$O) | | | | |

The catalyst suspensions prepared by the above five runs were used in certain examples as noted hereinafter.

EXAMPLE III

A portion of a concentrated suspension of catalyst prepared in accordance with Example I was diluted with 100 volumes of water. The resulting diluted catalyst suspension was used in treating small lumps of subbituminous coal in a ball mill.

The lumps of coal and the diluted catalyst suspension were fed to the ball mill at ambient temperature in the proportion of one pound of coal to one pound of catalyst suspension. The ball mill was rotated for 12 hours. Under these conditions, the coal lost its crystalline appearance and acquired the physical appearance and properties of weathered (oxidized) lignite or Leonardite.

Samples of the treated and untreated coal having about the same particle size were extracted with aqueous acetic acid and then with aqueous sodium hydroxide solution. The solubility of the treated coal was markedly greater than that of the original coal. It was apparent that treating the coal with the catalyst suspension changed the chemical composition and/or altered the bonds therein to produce both acid soluble and alkali soluble chemicals.

A portion of the treated coal was exposed to air for one hour at 100° C. The initial oxidation was carried further, and a mixture of water soluble acidic compounds such as phenols, carboxylic acids, and hydroxycarboxylic acids, was produced and subsequently extracted with aqueous sodium hydroxide solution. The degree of oxidation achieved by this treatment was equivalent to oxidizing the coal at 150° C. for a period of eight hours in shallow pans with frequent stirring. Treating coal with the aqueous catalyst suspension not only resulted in a remarkable degree of oxidation, but also seemed to activate the oxidizable sites whereby it was further oxidized by exposure to air in a minimum period of time and at low temperature.

A substantial amount of gas was liberated in the ball mill while treating the coal and a significant pressure was built up. The off gases contained hydrogen cyanide, cyanogen, hydrogen sulfide, sulfur dioxide, sulfur trioxide and carbon dioxide. The composition of the off gases indicated that the action of the catalyst suspension on the coal was one of oxidation.

A second portion of coal treated in the ball mill was extracted with acetone and then with benzene. Upon evaporating the solvents, a mixture of organic chemicals was obtained in each instance and it was not possible to determine the exact chemical composition. However, the compounds were different from those obtained upon extracting the treated coal with aqueous acetic acid and aqueous sodium hydroxide.

A third sample of the treated coal was analyzed. The treated coal contained substantially no alkali metal compounds or combustible sulfur and nitrogen compounds. The heating value was not changed significantly and the treated coal is a low sulfur and low nitrogen containing fuel which may be burned in coal burning furnaces. Upon combustion, the treated coal produces very little air pollution due to sulfur and nitrogen oxides and tube failure in furnaces is reduced to a minimum.

EXAMPLE IV

The five catalyst suspensions prepared by the five runs of Example II were tested for catalytic activity following the general procedure of Example III and were rated as active catalysts.

A portion of the catalyst suspension from each of the runs was frozen and thawed. When tested in accordance with the procedure of Example III, the frozen and thawed catalyst suspension had an even higher catalytic activity.

A portion of the frozen and thawed catalyst suspension from Run 4 of Example II was evaporated to dryness and the dry residue was used to prepare an aqueous catalyst suspension in deionized water. The catalyst suspension contained 1 part of the dry residue for each 600 parts of deionized water and it was an effective catalyst when tested in accordance with the procedure of Example III.

EXAMPLE V

This Example illustrates a further presently preferred process for preparing the catalyst of the invention.

Anhydrous calcium chloride in an amount of 0.66 gram and magnesium sulfate heptahydrate in an amount of 1.32 grams were dissolved in one liter of soft water heated to 80° C. Then 95 grams of sodium silicate pentahydrate was added to the resulting solution with stirring to produce a suspension of finely divided particles of the reaction product. The sodium silicate pentahydrate contained approximately 0.12 gram of aluminum when calculated as $Al_2O_3$ and a somewhat smaller amount of zinc when calculated as $ZnO$.

The suspension of the reaction product was maintained at 80° C. and stirred for one-half hour. Then an aqueous solution prepared by admixing 75 grams of sulfated castor oil with 100 mililiters of water was added slowly with stirring. The stirring was continued for one-half hour thereafter while maintaining the reaction mixture at 80° C. to produce catalyst-containing micelles.

The sulfated castor oil contained 6.5-7% of organically combined $SO_3$ on a dry basis, 0.9-1.1% of combined alkali when calculated as sodium oxide, no free alkali, and 50%±1% of material volatile at 105° C. which was mostly water. The average molecular weight of the sulfated castor oil molecule was approximately 400 grams per mole.

The above prepared suspension of catalyst was placed in plastic containers awaiting testing and use. The catalyst suspension was tested in accordance with Example III and was rated as a superior catalyst. It was possible to add from 1,000 to 10,000 parts of water to a portion of the catalyst suspension and still obtain excellent catalytic activity.

A further portion of the catalyst suspension was frozen and thawed, and then tested in accordance with the procedure of Example III. The cooling and warming steps enhanced the catalytic activity.

A further portion of the catalyst suspension was admixed with commercially available surfactants in quantities sufficient to serve as a laundry detergent. No detrimental effects were noted. It was also possible to add additional alkali metal silicate having a mole ratio of $SiO_2$ to $Na_2O$ of 1.6:1 to 3:1 without detrimental effects. Thus, the aqueous catalyst suspension is sufficiently stable to allow addition of laundry detergents or builders such as alkali metal silicates, nitrilotriacetic acid and phosphates.

EXAMPLE VI

The general procedure of Example V was followed with the exception of using 0.33 gram of anhydrous calcium chloride rather than 0.66 gram, 0.66 gram of magnesium sulfate heptahydrate rather than 1.32 grams, and 45 grams of sodium silicate pentahydrate rather than 95 grams. The remaining ingredients and steps in the Example I procedure for preparing the catalyst were not changed.

The resulting catalyst suspension was approximately one-half as concentrated as that prepared in Example V.

Upon testing in accordance with Example III, it was found to be as effective as the catalyst of Example V when calculated on a dry solid basis. It was also possible to add surfactants and alkali metal silicates as described in Example V without adverse effect. Cooling the catalyst suspension to temperatures approaching the freezing point or freezing, followed by warming or thawing, also had a beneficial effect upon the catalytic activity.

EXAMPLE VII

This Example illustrates the preparation of the fossil fuel solutions of the invention from lignite.

Lignite from the Havelock Mine, New England, North Dakota was ground to minus 60 mesh (Tyler Screen) and 200 grams thereof was admixed with 250 ml of a catalyst suspension prepared in accordance with Example I and diluted with 1000 volumes of water. The admixture was treated for 2 hours at room temperature (72° F.) in a 1 quart Abbe Ball Mill using $\frac{3}{4}''$ ceramic balls. Following the treatment, the reaction mixture was filtered to obtain a glassy black pitch-like solid residue of treated lignite particles and a yellow liquid treating solution having a pH of 6.7.

The treated lignite particles were extracted with acetone to produce a dark red solution and a residue of acetone extracted particles. The acetone extracted particles were further extracted with 3 M hydrochloric acid to obtain a yellow-orange acidic extract solution and an acid extracted residue.

The acid extracted char was further treated with 1 M sodium hydroxide solution and the mixture set to a jet-black pitchlike substance. The solution was filtered with difficulty to yield a black thick liquid and a sodium hydroxide treated residue. When the residue was washed with water, the solid material peptized and passed through the filter. Thus, substantially all of the lignite was solubilized.

EXAMPLE VIII

This Example illustrates the preparation of an aqueous solution of catalyst treated lignite.

Weathered lignite having a particle size of minus 80 mesh (Tyler Screen) was admixed in an amount of 50 pounds with 2.50 ml of the catalyst suspension prepared in accordance with Example I and 8 gallons of hot soft water having a temperature of 150° F. The admixture was heated and stirred and after five minutes, the pH value was approximately 5. The admixture was allowed to set without heating for 12 hours and then 2 pounds of flake caustic (78% sodium hydroxide) was added. The admixture was stirred for approximately 5 minutes and the pH was 5–6. The wet catalyst treated lignite was air dried and stored in a plastic container.

The above prepared catalyst treated lignite was admixed in an amount of 298 grams with 307 grams of the catalyst suspension prepared in accordance with Example I. The resultant moist solid was stored in an airtight container while awaiting the preparation of a solution. Thereafter, 5 grams of this admixture was added to one gallon of soft water. Substantially all of the treated lignite dissolved forming a dark opague blue-black solution. The solution contained the catalyst in a concentration equivalent to diluting the catalyst suspension of Example I with 1000 volumes of water and it also contained 700 parts per million of the dissolved catalyst treated lignite. The pH value was 7.

The above prepared lignite solution was tested on cultures of Staphylococcus Aures (gram positive) and Escherichia Coli (gram negative). The solution completely inhibited the growth of both Staphylococcus Aures and Escherichia Coli.

EXAMPLE XI

This Example illustrates the treatment of Havelock Mine lignite having a particle size such that 85% passed through a minus 85 mesh Tyler Screen.

An admixture of 70 pounds of the lignite, 300 ml of the catalyst suspension prepared in accordance with Example I and 8 gallons of soft water having a temperature of 150° F. was prepared. After 5 minutes of heating and stirring, the pH was 5 and 2.2 pounds of flake caustic soda (78% sodium hydroxide) was added. The pH of the resultant solution was 12 and after one-half hour of heating the pH was 11. The admixture was allowed to set for 12 hours.

Thereafter $\frac{1}{3}$ of the treated lignite was air dried. A white encrustation appeared on the surface after drying. A second $\frac{1}{3}$ portion of the treated lignite was kept moist with water for 2 days to determine if air oxidation continues provided the treated lignite is kept moist and basic. Upon testing, it was found that the air oxidation did continue. A white encrustation formed on the surface of the treated lignite when dry. The remaining $\frac{1}{3}$ portion of the treated lignite was admixed with 2 gallons of hot soft water and thereafter 100 grams of sodium perborate was added. The temperature was 76° C. Thereafter, the treated lignite was air dried in the sun and no white encrustation developed on the surface.

I claim:

1. A method of rendering grain and forage crops useful as animal feed more palatable and digestible when fed to said animals which comprises
    applying to said grain or forage crops prior to feeding to said animals an aqueous solution containing water soluble organic substances produced by intimately contacting solid fossil fuel in particulate form selected from the group consisting of coal, lignite, peat and admixtures thereof with an aqueous medium containing a catalytically effective amount of a catalyst,
    the solid fossil fuel having active sites therein which react with the aqueous medium under liquid conditions in the presence of said catalyst to produce said water soluble organic substances, and
    the particles of the solid fossil fuel being intimately contacted with the aqueous medium under liquid conditions in the presence of said catalyst until active sites of said fuel react with the aqueous medium to produce said water soluble organic substances,
    the catalyst being prepared by a process comprising
    admixing a water soluble alkali metal silicate with an aqueous medium containing a dissolved substance which is a source of calcium ion and a dissolved substance which is a source of magnesium ion,
    the aqueous medium containing said dissolved substances in amounts to provide between about $1 \times 10^{-4}$ and $1 \times 10^{-1}$ mole per liter each of calcium ion and magnesium ion,
    the aqueous medium containing said dissolved substances in amounts to provide a molar ratio of calcium ion to magnesium ion between about 2.0:1.0 and 1.0:2.0,
    the alkali metal silicate having an alkali metal oxide to silicon dioxide ratio between about 0.9:1.0 and less than 2.0:1.0 and being admixed with the aqueous medium in an amount of about 0.05–2 moles per liter, reacting the alkali metal silicate with said dissolved substances providing calcium ion and magnesium ion to produce an aqueous suspension of finely divided particles of the reaction product;

admixing a micelle-forming surfactant with the aqueous medium in an amount to form catalyst micelles comprising said finely divided particles upon agitating the aqueous medium, and agitating the aqueous medium containing the finely divided particles and surfactant to form said catalyst micelles.

2. The method of claim 1 wherein the solid fossil fuel is coal.

3. The method of claim 2 wherein in the process for preparing the catalyst, the alkali metal silicate is admixed with an aqueous medium containing said dissolved substances in amounts to provide between about $2.5 \times 10^{-3}$ and $3.0 \times 10^{-3}$ mole per liter each of calcium ion and magnesium ion, the aqueous medium contains about equimolar amounts of calcium ion and magnesium ion, about 0.2–0.3 mole per liter of the alkali metal silicate is admixed with the aqueous medium, and the alkali metal silicate is sodium metasilicate having a sodium oxide to silicon dioxide ratio of about 1.0:1.0.

4. The method of claim 3 wherein in the process for preparing the catalyst, the surfactant comprises sulfated castor oil.

5. The method of claim 3 wherein in the process for preparing the catalyst, at least 25% of the hydroxy groups of the castor oil are sulfated, and about 0.03–0.07 mole per liter of the sulfated castor oil is admixed with the aqueous medium.

6. The method of claim 3 wherein in the process for preparing the catalyst, the alkali metal silicate is admixed with an aqueous medium containing said dissolved substances in amounts to provide about $2.9 \times 10^{-3}$ mole per liter of calcium ion and about $2.7 \times 10^{-3}$ mole per liter of magnesium ion, about 0.25 mole per liter of sodium metasilicate having a sodium oxide to silicon dioxide ratio of about 1.0:1.0 is admixed with the aqueous medium, the aqueous medium contains not more than 10 parts per million by weight of carbonate ion and bicarbonate ion, the surfactant comprises sulfated castor oil and at least 50% of the hydroxy groups of the castor oil are sulfated, and about 0.05 mole per liter of the sulfated castor oil is admixed with the aqueous medium.

7. In a method of storing grain and forage crops useful as animal feed wherein said grain and forage is held in non-airtight storage while awaiting feeding said grain and forage to said animals, the improvement in combination therewith which comprises applying to said grain or forage crops an aqueous solution containing water soluble organic substances produced by intimately contacting solid fossil fuel in particulate form selected from the group consisting of coal, lignite, peat and admixtures thereof with an aqueous medium containing a catalytically effective amount of a catalyst, the solid fossil fuel having active sites therein which react with the aqueous medium under liquid conditions in the presence of said catalyst to produce said water soluble organic substances, and the particles of the solid fossil fuel being intimately contacted with the aqueous medium under liquid conditions in the presence of said catalyst until active sites of said fuel react with the aqueous medium to produce said water soluble organic substances, the catalyst being prepared by a process comprising admixing a water soluble alkali metal silicate with an aqueous medium containing a dissolved substance which is a source of calcium ion and a dissolved substance which is a source of magnesium ion, the aqueous medium containing said dissolved substances in amounts to provide between about $1 \times 10^{-4}$ and $1 \times 10^{-1}$ mole per liter each of calcium ion and magnesium ion, the aqueous medium containing said dissolved substances in amounts to provide a molar ratio of calcium ion to magnesium ion between about 2.0:1.0 and 1.0:2.0, the alkali metal silicate having an alkali metal oxide to silicon dioxide ratio between about 0.9:1.0 and less than 2.0:1.0 and being admixed with the aqueous medium in an amount of about 0.05–2 moles per liter, reacting the alkali metal silicate with said dissolved substances providing calcium ion and magnesium ion to produce an aqueous suspension of finely divided particles of the reaction product, admixing a micelle-forming surfactant with the aqueous medium in an amount to form catalyst micelles comprising said finely divided particles upon agitating the aqueous medium, and agitating the aqueous medium containing the finely divided particles and surfactant to form said catalyst micelles.

8. The method of claim 7 wherein the solid fossil fuel is lignite.

9. The method of claim 7 wherein in the process for preparing the catalyst, said ratio of calcium ion to magnesium ion is between about 1.5:1.0 and 1.0:1.5.

10. The method of claim 7 wherein in the process for preparing the catalyst, said ratio of calcium ion to magnesium ion is about 1.0:1.0.

11. The method of claim 7 wherein in the process for preparing the catalyst, the alkali metal silicate is admixed with an aqueous medium containing said dissolved substances in amounts to provide between about $1 \times 10^{-3}$ and $6 \times 10^{-3}$ mole per liter each of calcium ion and magnesium ion.

12. The method of claim 7 wherein in the process for preparing the catalyst, the alkali metal silicate is admixed with an aqueous medium containing said dissolved substances in amounts to provide between about $2.5 \times 10^{-3}$ and $3.0 \times 10^{-3}$ mole per liter each of calcium ion and magnesium ion.

13. The method of claim 7 wherein in the process for preparing the catalyst, about 0.2–0.3 mole per liter of the alkali metal silicate is admixed with the aqueous medium.

14. The method of claim 7 wherein in the process for preparing the catalyst, the alkali metal silicate has an alkali metal oxide to silicon dioxide ratio between about 0.9:1.0 and 1.2:1.0.

15. The method of claim 7 wherein in the process for preparing the catalyst, the alkali metal silicate is alkali metal metasilicate having an alkali metal oxide to silicon dioxide ratio of about 1.0:1.0.

16. The method of claim 7 wherein in the process for preparing the catalyst, about 0.001–0.1 mole per liter of the surfactant is admixed with the aqueous medium.

17. The method of claim 7 wherein in the process for preparing the catalyst, the surfactant comprises sulfated castor oil.

18. The method of claim 7 wherein in the process for preparing the catalyst, the alkali metal silicate is admixed with an aqueous medium containing said dissolved substances in amounts to provide between about $1 \times 10^{-3}$ and $6 \times 10^{-3}$ mole per liter each of calcium ion and magnesium ion, the ratio of calcium ion to magnesium ion is between about 1.5:1.0 and 1.0:1.5, about 0.1–1 mole per liter of the alkali metal silicate is admixed with the aqueous medium, and the alkali metal silicate has an alkali metal oxide to silicon dioxide ratio between about 0.9:1.0 and 1.2:1.0.

19. The method of claim 7 wherein in the process for preparing the catalyst, the alkali metal silicate is admixed with an aqueous medium containing said dissolved substances in amounts to provide between about $2.5 \times 10^{-3}$ and $3.0 \times 10^{-3}$ mole per liter each of calcium ion and magnesium ion, the aqueous medium contains about equimolar amounts of calcium ion and magnesium ion, about 0.2–0.3 mole per liter of the alkali metal silicate is admixed with the aqueous medium, and the alkali metal silicate has an alkali metal oxide to silicon dioxide ratio of about 1.0:1.0.

20. The method of claim 19 wherein in the process for preparing the catalyst, the alkali metal metasilicate is sodium metasilicate having an alkali metal oxide to silicon dioxide ratio of about 1.0:1.0.

21. The method of claim 19 wherein in the process for preparing the catalyst, about 0.03–0.07 mole per liter of the surfactant is admixed with the aqueous medium.

22. The method of claim 21 wherein in the process for preparing the catalyst, the surfactant comprises sulfated castor oil.

23. The method of claim 22 wherein in the process for preparing the catalyst, the alkali metal metasilicate is sodium metasilicate having a sodium oxide to silicon dioxide ratio of about 1.0:1.0.

24. The method of claim 23 wherein in the process for preparing the catalyst, at least 25% of the hydroxy groups of the castor oil are sulfated, and about 0.03–0.07 mole per liter of the sulfated castor oil is admixed with the aqueous medium.

25. The method of claim 19 wherein in the process for preparing the catalyst, the alkali metal silicate is admixed with an aqueous medium containing said dissolved substances in amounts to provide about $2.9 \times 10^{-3}$ mole per liter of calcium ion and about $2.7 \times 10^{-3}$ mole per liter of magnesium ion, about 0.25 mole per liter of sodium metasilicate having a sodium oxide to silicon dioxide ratio of about 1.0:1.0 is admixed with the aqueous medium, the aqueous medium contains not more than 10 parts per million by weight of carbonate ion and bicarbonate ion, the surfactant comprises sulfated castor oil and at least 50% of the hydroxy groups of the castor oil are sulfated, and about 0.05 mole per liter of the sulfated castor oil is admixed with the aqueous medium.

* * * * *